United States Patent
Stephens et al.

(10) Patent No.: US 10,843,085 B2
(45) Date of Patent: Nov. 24, 2020

(54) MEDIA-ACTIVITY BINDING AND CONTENT BLOCKING

(71) Applicant: SONY INTERACTIVE ENTERTAINMENT LLC, San Mateo, CA (US)

(72) Inventors: Mischa Stephens, San Mateo, CA (US); Dustin Clingman, San Mateo, CA (US); Adil Sherwani, San Mateo, CA (US)

(73) Assignee: S0NY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/220,460

(22) Filed: Dec. 14, 2018

(65) Prior Publication Data
US 2020/0188794 A1    Jun. 18, 2020

(51) Int. Cl.
| | | |
|---|---|---|
| A63F 13/69 | (2014.01) | |
| A63F 13/79 | (2014.01) | |
| H04N 21/23 | (2011.01) | |
| A63F 13/85 | (2014.01) | |
| A63F 13/40 | (2014.01) | |

(52) U.S. Cl.
CPC .............. *A63F 13/79* (2014.09); *A63F 13/40* (2014.09); *A63F 13/85* (2014.09); *H04N 21/23* (2013.01)

(58) Field of Classification Search
CPC .......... A63F 13/10; A63F 13/12; A63F 13/32; A63F 13/44; A63F 13/45; A63F 13/47; A63F 13/52; A63F 13/55; A63F 13/60; A63F 13/69; A63F 13/77; A63F 13/79; A63F 2300/535; A63F 2300/538;
(Continued)

(56) References Cited

U.S. PATENT DOCUMENTS

| | | |
|---|---|---|
| 9,168,460 B2 | 10/2015 | Pearce |
| 2009/0170609 A1 | 7/2009 | Kang et al. |

(Continued)

FOREIGN PATENT DOCUMENTS

| | | |
|---|---|---|
| KR | 2018-0094833 | 8/2018 |
| WO | WO 2009/094611 | 7/2009 |

(Continued)

OTHER PUBLICATIONS

PCT/US19/62602, Targeted Gaming News and Content Feeds, Nov. 21, 2019.
(Continued)

*Primary Examiner* — Omkar A Deodhar
(74) *Attorney, Agent, or Firm* — Polsinelli LLP

(57) ABSTRACT

A system and method for providing a content block is provided. A media content title associate with at least one activity file may be stored in memory. A user request may be received by a server from a user device to stream the media content title. Such user request may include a user profile specifying a list of completed and in-progress activities in which a user has engaged with. The stream of the media content title may be monitored to identify a trigger indicating that an activity to be displayed is not on the list of user activities specified by the user profile. Display on the streaming media may be advanced to a next activity identified as being on the list of user activities specified by the user profile.

24 Claims, 4 Drawing Sheets

(58) Field of Classification Search
CPC ........ A63F 2300/552; A63F 2300/5546; A63F 2300/5593; A63F 2300/638
See application file for complete search history.

(56) References Cited

U.S. PATENT DOCUMENTS

| | | |
|---|---|---|
| 2011/0113149 A1 | 5/2011 | Kaal |
| 2011/0319229 A1 | 12/2011 | Corbals et al. |
| 2012/0004956 A1 | 1/2012 | Huston et al. |
| 2012/0094762 A1 | 4/2012 | Khan |
| 2013/0064527 A1 | 3/2013 | Maharajh et al. |
| 2013/0086484 A1 | 4/2013 | Antin et al. |
| 2013/0165234 A1 | 6/2013 | Hall et al. |
| 2013/0244785 A1 | 9/2013 | Gary |
| 2014/0243098 A1 | 8/2014 | Yong et al. |
| 2015/0245084 A1 | 8/2015 | Downing et al. |
| 2015/0381689 A1 | 12/2015 | Ganesh et al. |
| 2016/0078471 A1 | 3/2016 | Hamedi |
| 2016/0149956 A1* | 5/2016 | Birnbaum ............. H04L 63/101 726/1 |
| 2018/0014077 A1* | 1/2018 | Hou ..................... H04N 21/458 |
| 2018/0318708 A1 | 11/2018 | Rom et al. |
| 2018/0343505 A1 | 11/2018 | Loheide et al. |
| 2019/0208242 A1* | 7/2019 | Bates ................... H04N 21/251 |
| 2019/0282906 A1 | 9/2019 | Yong |
| 2020/0188781 A1 | 6/2020 | Stephens |
| 2020/0188792 A1 | 6/2020 | Stephens |
| 2020/0188796 A1 | 6/2020 | Stephens |
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |

FOREIGN PATENT DOCUMENTS

| | | |
|---|---|---|
| WO | WO 2014/047490 | 3/2014 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |

OTHER PUBLICATIONS

PCT/US19 /62626, Interactive Objects in Streaming Media and Marketplace Ledgers, Nov. 21, 2019.
PCT/US19/62606, Media-Activity Binding and Content Blocking, Nov. 21, 2019.
PCT/US19/62613, Experience-Based Peer Recommendations, Nov. 21, 2019.
U.S. Appl. No. 16/220,397, Mischa Stephens, Targeted Gaming News and Content Feeds, filed Dec. 14, 2018.
U.S. Appl. No. 16/359,683, Mischa Stephens, Targeted Gaming News and Content Feeds, filed Mar. 20, 2019.
U.S. Appl. No. 16/379,683, Mischa Stephens, Interactive Objects in Streaming Media and Marketplace Ledgers, filed Apr. 9, 2019.
U.S. Appl. No. 16/380,760, Mischa Stephens, Media-Activity Binding and Content Blocking, filed Apr. 10, 2019.
U.S. Appl. No. 16/220,443, Mischa Stephens, Interactive Objects in Streaming Media and Marketplace Ledgers, filed Dec. 14, 2018.
U.S. Appl. No. 16/220,465, Mischa Stephens, Experience-Based Peer Recommendations, filed Dec. 14, 2018.
U.S. Appl. No. 16/358,546, Mischa Stephens, Experience-Based Peer Recommendations, filed Mar. 19, 2019.
PCT Application No. PCT/US2019/062626 International Search Report and Written Opinion dated Jan. 29, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
PCT Application No. PCT/US2019/062602 International Search Report and Written Opinion dated Feb. 14, 2020.
U.S. Appl. No. 16/380,760 Office Action dated Mar. 6, 2020.
U.S. Appl. No. 16/220,465 Office Action dated Jun. 15, 2020.
U.S. Appl. No. 16/358,546 Office Action dated May 20, 2020.
U.S. Appl. No. 16/885,629, Dustin S. Clingman, Media-Object Binding for Displaying Real-Time Play Data for Live-Streaming Media, filed May 28, 2020.
U.S. Appl. No. 16/885,653, Dustin S. Clingman Media-Object Binding for Predicting Performance in a Media, filed May 28, 2020.
U.S. Appl. No. 16/885,641, Dustin S. Clingman, Media-Object Binding for Dynamic Generation and Displaying of Play Data Associated With Media, filed May 28, 2020.
U.S. Appl. No. 16/220,397 Office Action dated Sep. 25, 2020.

* cited by examiner

MEDIA-ACTIVITY BINDING AND CONTENT BLOCKING

BACKGROUND OF THE INVENTION

1. Field of the Invention

The present technology pertains to streaming media. More specifically, the present technology may provide for media-activity binding and content blocking.

2. Description of the Related Art

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media typically consist of media streamed to a user (e.g., video streams), which may feature one or more activities with which a user has not interacted or that the user has seen. Typically, a user must either recognize that the activity is an unfamiliar or new one (e.g., a "spoiler") or have researched from another source that the activity shown includes content that the user has not seen.

Due to the popularity of gaming, viewing media content of activities prior to interacting with the activity may detract from the user experience. For example, significant events may occur during such activity that may contribute to a storyline and exposure to such event may expose important aspects of storyline before the user has reached the event. Further, such exposure may dis-incentivize a user from gameplay as the user may feel that they have already seen what will happen later in the game. In another example, users may wish to know more about an activity or object shown in the streaming media. Conventionally, users must perform their own research on such activity or object through various other sources.

There is, therefore, a need in the art for systems and methods for media-activity binding and content blocking.

SUMMARY OF THE PRESENTLY CLAIMED INVENTION

Embodiments of the present invention include systems and methods for providing media-activity binding and content blocking. A media content title associate with at least one activity file may be stored in memory. Such at least one activity file may include data about an activity displayed during at least a portion of the media content title. A user request may be received by a server from a user device to stream the media content title. Such user request may include a user profile specifying a list of completed and in-progress activities in which a user has engaged with. The stream of the media content title may be monitored to identify a trigger indicating that an activity to be displayed is not on the list of user activities specified by the user profile. Display on the streaming media may be advanced to a next activity identified as being on the list of user activities specified by the user profile.

Various embodiments may include methods for providing media-activity binding and content blocking. Such methods may include storing a media content title associated with at least one activity file. Such at least one activity file may include data about an activity displayed during at least a portion of the media content title. Such methods may include receiving a user request from a user device to stream the media content title. Such user request may include a user profile specifying a list of completed and in-progress activities in which a user has engaged. Such methods may include monitoring the stream of the media content title to identify a trigger indicating that an activity to be displayed is not on the list of user activities specified by the user profile. Such methods may include advancing display of the streaming media to a next activity identified as being on the list of user activities specified by the user profile.

Additional embodiments may include systems for providing media-activity binding and content blocking. Such systems may include memory that stores a media content title associated with at least one activity file. Such at least one activity file may include data about an activity displayed during at least a portion of the media content title. Such system may include a processor that executes instructions stored in memory. Execution of the instructions by the processor may receive a user request from a user device to stream the media content title. Such user request may include a user profile specifying a list of completed and in-progress activities in which a user has engaged. Execution of the instructions by the processor may monitor the stream of the media content title to identify a trigger indicating that an activity to be displayed is not on the list of user activities specified by the user profile. Execution of the instructions by the processor may advance display of the streaming media to a next activity identified as being on the list of user activities specified by the user profile.

Further embodiments include non-transitory computer-readable storage media having embodied thereon a program executable by a processor to provide a method for media-activity binding and content blocking.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for media-activity binding and content blocking. A plurality of media content titles may be stored in a database. Such media content titles may each include a media file and at least one activity file. A user request may be received by a server from a user to stream a media content title. Such user request may include a user profile having a list of user activities. Such list of user activities may include completed activities and in progress activities. The media content title may be streamed by the server. A trigger may be received by the server that an activity to be displayed is not on the list of user activities. The media content title may be advanced to a next activity that is on the list of user activities by the server.

Figure 1:
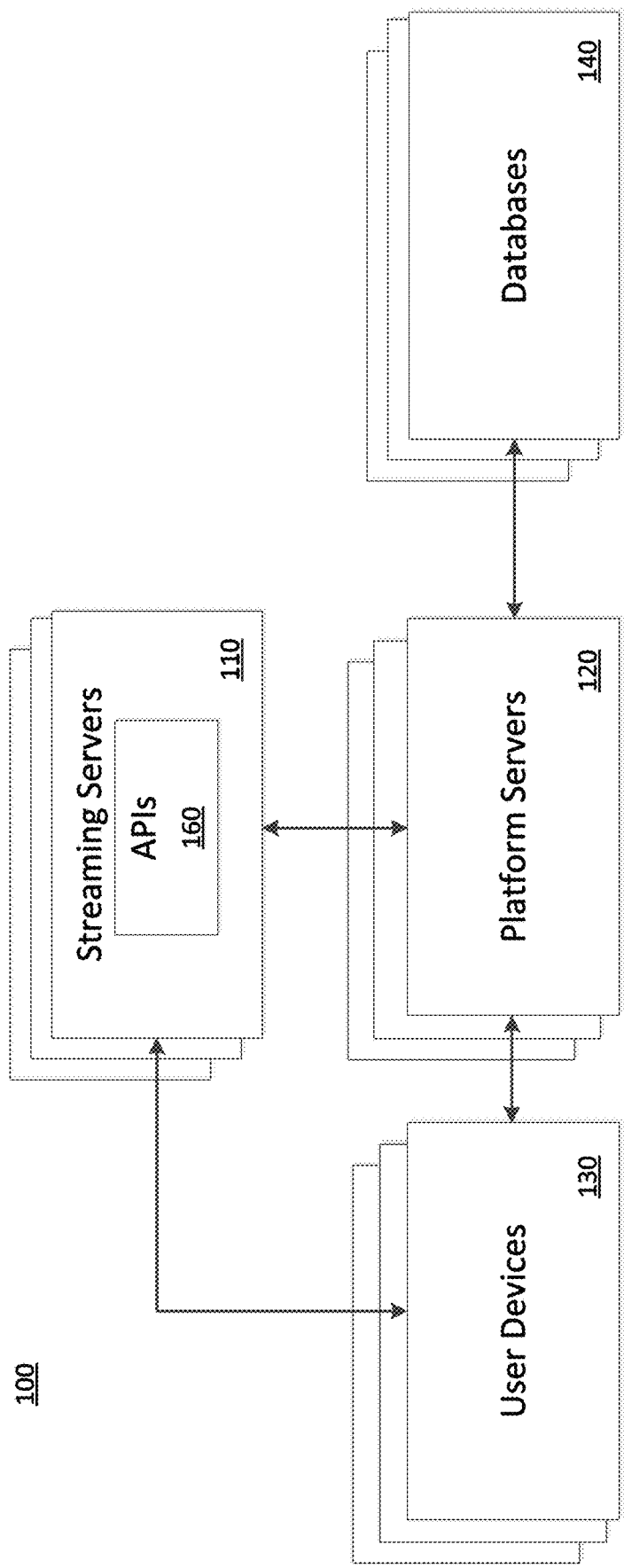
FIG. 1 illustrates an exemplary network environment in which a system for media-activity binding and content blocking may be implemented.

FIG. 1 illustrates an exemplary network environment 100 in which a system for providing media-activity binding and content blocking can occur. The network environment 100 may include one or more streaming servers 110 that provide streaming content (e.g., interactive video, podcasts, etc.), platform servers 120, one or more user devices 130, and one or more databases 140.

Media servers 110 may maintain and host interactive streaming media available to stream on a user device 130 over a communication network. Such streaming servers 110 may be implemented in the cloud (e.g., one or more cloud servers). Each streaming media may include one or more activities shown, and each activity may include one or more objects available for interaction with by a user. Data about the activity or a user interaction with an activity and/or object shown in the streaming media may be stored by the platform servers 120 and/or the user device 130, as will be discussed in detail with respect to FIG. 2.

The platform servers 120 may be responsible for communicating with the different streaming servers 110, databases 140, and user devices 130. Such platform servers 120 may be implemented on one or more cloud servers. The streaming servers 110 may communicate with multiple platform servers 120. The platform servers 120 may also carry out instructions, for example, receiving a user request from a user to stream a media content title (i.e., video, podcasts, User Generated Content, publisher content, etc.). Such user request may include a user profile having a list of user activities. The platform servers 120 may further carry out instructions, for example, for streaming the media content titles. Such media content title may include at least one activity file having data about an activity displayed during at least a portion of the media content. The platform servers 120 may further carry out instructions, for receiving a trigger that an activity to be displayed is not on the list of user activities. The platform servers 120 may further carry out instructions, for example, advancing the streaming media to a next activity that is on the list of user activities.

The streaming media content titles and their corresponding activity information may be provided through an application programming interface (API) 160, which allows various types of streaming servers 110 to communicate with different platform servers 120 and different user devices 130. API 160 may be specific to the particular computer programming language, operating system, protocols, etc., of the streaming servers 110 providing the streaming media content titles, the platform servers 120 providing the associated activity and/or object information, and user devices 130 receiving the same. In a network environment 100 that includes multiple different types of streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the streaming servers 110, on the same server, on different servers, on a single server, or across different servers. Such databases 140 may store streaming media from publishers of media content titles and/or third party publishers or UGG (e.g., screen shots, videos, commentary, mashups, etc.) created by peers. Such UGC may include metadata by which to search for such media. Such UGC may also include information about the media content title and/or peer. Such information may be derived from data gathered during peer interaction with an activity of an interactive content title (e.g., a video game, interactive book, etc.) and may be "bound" to and stored with the UGC. Such binding enhances UGC as the UGC may deep link (e.g., directly launch) to a media content title, may provide for information about an activity and/or a peer of the UGC, and/or may allow a user to interact with the UGC.

Figure 2:
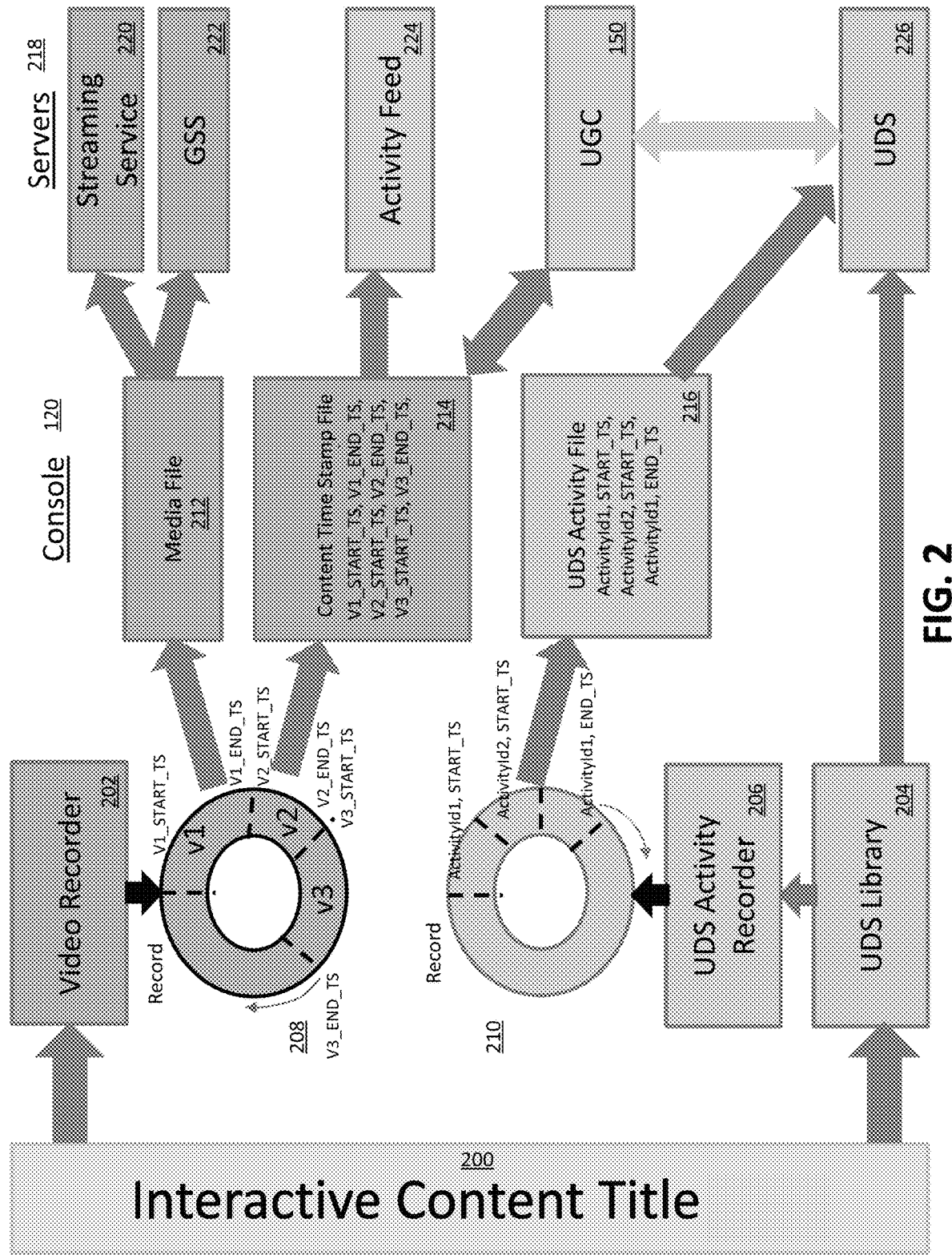
FIG. 2 illustrates a detailed exemplary network in which a system for binding data from a universal data system to user generated content may be implemented.

The exemplary network environment 250 of FIG. 2, an exemplary platform server 120 and exemplary end servers (e.g., streaming server 220, GSS 222, activity feed server 224, UGC server and database 150, and UDS server 226) are shown. In an exemplary example, a content recorder 202 receives and records content from an interactive content title 200 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the platform server 120. Such media file 212 may be uploaded to the streaming server 220 and/or the GSS 222 for storage. Such start times and end times for each segment may be stored as a content time stamp file 214 by the platform server 120. Such content time stamp file 214 may also include a streaming ID or GSS ID to link the content time stamp file 214 to the media file 212. Such content time stamp file 214 may be uploaded and stored to the activity feed server 224 and/or the UGC server and database 150.

Meanwhile, a UDS activity recorder 206 receives and records activity data from a UDS library 204 onto a UDS ring-buffer 210 (e.g., ActivityID1, START_TS; ActivityID2, START_TS; ActivityID3, START_TS). Such UDS library 204 receives data from the interactive content title 200 and may transmit data to the UDS activity recorder 206 when an activity occurs and/or transmit data to a UDS server 226. Such activity data can be stored in a UDS activity file 216 by the platform server 120. Such UDS activity file 216 may also include activity start times, activity end times, an activity ID, activity results, activity types (e.g., competitive match, quest, task, etc.), user or peer data related to the activity. For example, a UDS activity file 216 may store data regarding an item used during the activity.

Such UDS activity data may be associated with the content data. In one example, the UGC server 150 stores the content time stamp file 214. The UGC server 150 can associated the file 214 with the media file 212 by the streaming ID or GSS ID stored with the file 214. The UGC server 150 can also communicate with the UDS server 226 to query for a UDS activity file 216 that matches the content time stamp file 214. Such query can search by matching start time and end time of the content time stamp file 214 with the start time and end time of a corresponding UDS activity file 216. Such query can also search for a match between the activity ID stored with the UDS activity file 216 and the GSS ID or streaming ID of the content time stamp file 214. Such UDS activity file 216 may be associated with the matched content time stamp file 214 by the UGC server 150. In another example, a UDS activity file 216 and a content time stamp file 214 are associated by the platform server 120 during creation of each file 214, 216.

Figure 3:
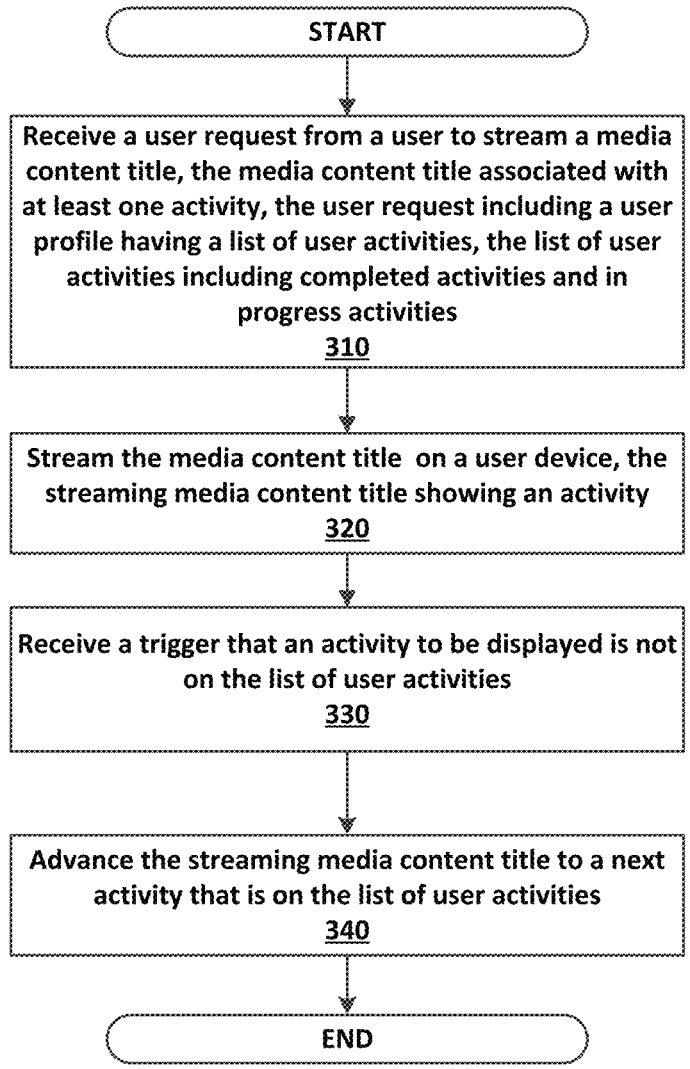
FIG. 3 is a flowchart illustrating an exemplary method for content blocking.

FIG. 3 is a flowchart illustrating an exemplary method 300 for providing media-activity binding and content blocking. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, a user request is received from a user of a user device 130 by the platform server 120 or the streaming servers 110 to stream a media content title. Such media content title may be stored in the database 140 and may include one or more activities. Such user request may include a user profile that includes a list of user activities. Such list of user activities may include completed activities and in progress activities. Each in progress activities may include a flag indicating where a user has stopped interaction within each activity. For example, a user may have completed 25% of an activity and a corresponding flag indicating 25% completion may be stored with the activity. Each in progress activity and completed activity may also include activity start times, activity end times, an activity ID, activity results, activity types (e.g., competitive match, quest, task, etc.), user or peer data related to the activity.

In step 320, the media content title is streamed by the streaming server 110 or the platform server 120. Such media content title may be stored in the database 140, at the streaming server 110, or the platform server 120. Such media content title may include a media file having a plurality of time stamps (i.e., Content Time Stamp File 214) associated with the media content title. The media content title may also include at least one activity file having a corresponding plurality of time stamps (i.e., UDS Activity File 216). Each activity file may also include data about an activity displayed during at least a portion of the media content title such as activity start times, activity end times, an activity ID, activity results, activity types (e.g., competitive match, quest, task, etc.), user or peer data related to the activity. Each activity file may also include a direct link to the associated activity. Such link allows a user to access an activity from media content title. For example, a user may wish to participate in an activity shown by the media content title. In the same example, the user can select an option to play the activity, and the activity may be automatically launched after selection by the user. Alternatively, the activity file may block the user from accessing the activity if the user does not own the media content title and may prompt the user to purchase such title.

Such direct link may also allow a user to access an activity within a media content title while in another activity or while viewing streaming a media content title during participation in another activity. For example, a user may be participating in an activity and may wish to switch or "jump" to another activity within the same or a different media content title. The user can view a list of activities available to the user and may select another activity. Such selection will save a progress of the current activity and automatically launch the new activity. In another example, the user may be participating in an activity and may a view streaming media content title related to such activity. The streaming media content title may also feature other activities. The user may select one of the other activities, which will automatically launch the new activity and save a progress of the current activity.

The media content title may be UGC generated by the user or by peers, content generated by a publisher of a media content title, or content published by third party users. Such media content title may be a help video published by a peer or publisher that is relevant to an activity of a media content title. Such media content title may be suggested to a user based on an activity the user is currently participating in or will be participating in. For example, a user may not know how to advance within an activity and a help video may be suggested to the user that can provide tips or a tutorial on how to advance. In another example, a user may wish to view UGC and UGC relevant to activities recently played by the user may be suggested. The media content title may be identified by matching key words or metadata between a help video and an activity the user is participating in.

In step 330, a trigger may be received that an activity to be displayed is not on the list of user activities. Generating or prompting such trigger may include retrieving an activity id from an activity file associated with an activity prior to the media content title streaming the activity by the platform server 120 or the streaming server 110. Prompting such trigger may also include comparing the activity id to each activity id in the list of user activities and generating the trigger that the retrieved activity id does not match any activity id in the list of user activities. In other words, the trigger alerts or notifies the platform server 120 or the streaming server 110 that the media content title that is about to be streamed may include content that the user has not yet been exposed to and may "spoil" the corresponding activity that the user has not participated in yet or has not progressed far enough.

In step 340, the streaming media content title may be advanced to a next activity that is on the list of user activities. Such next activity may be a completed activity on the list of user activities. Alternatively, the streaming media content title may transmit a notification to the user that the user may be exposed to content that the user has not interacted with or experienced yet. As such, the notification may provide the user a choice to continue viewing the media content title or to skip the media content title.

Systems and methods for media-activity binding and content blocking may enhance a user experience by providing information about an activity shown in a streaming media and by blocking media that may include content that the user has not yet been exposed to. Providing information immediately about an activity may incentivize users to continue or begin gameplay with a media content title.

Further, object information may incentivize a user to purchase the media content title associated with the object. Such object information may further incentivize a user to continue or begin interaction with a media content title to reach a certain time period in the title where the object is located. In other words, a user may be incentivized to continue playing a title until the object is reached. Further, content blocking while viewing the media content title may prevent a user from becoming discouraged by viewing content that the user has not yet been exposed to.

Figure 4:
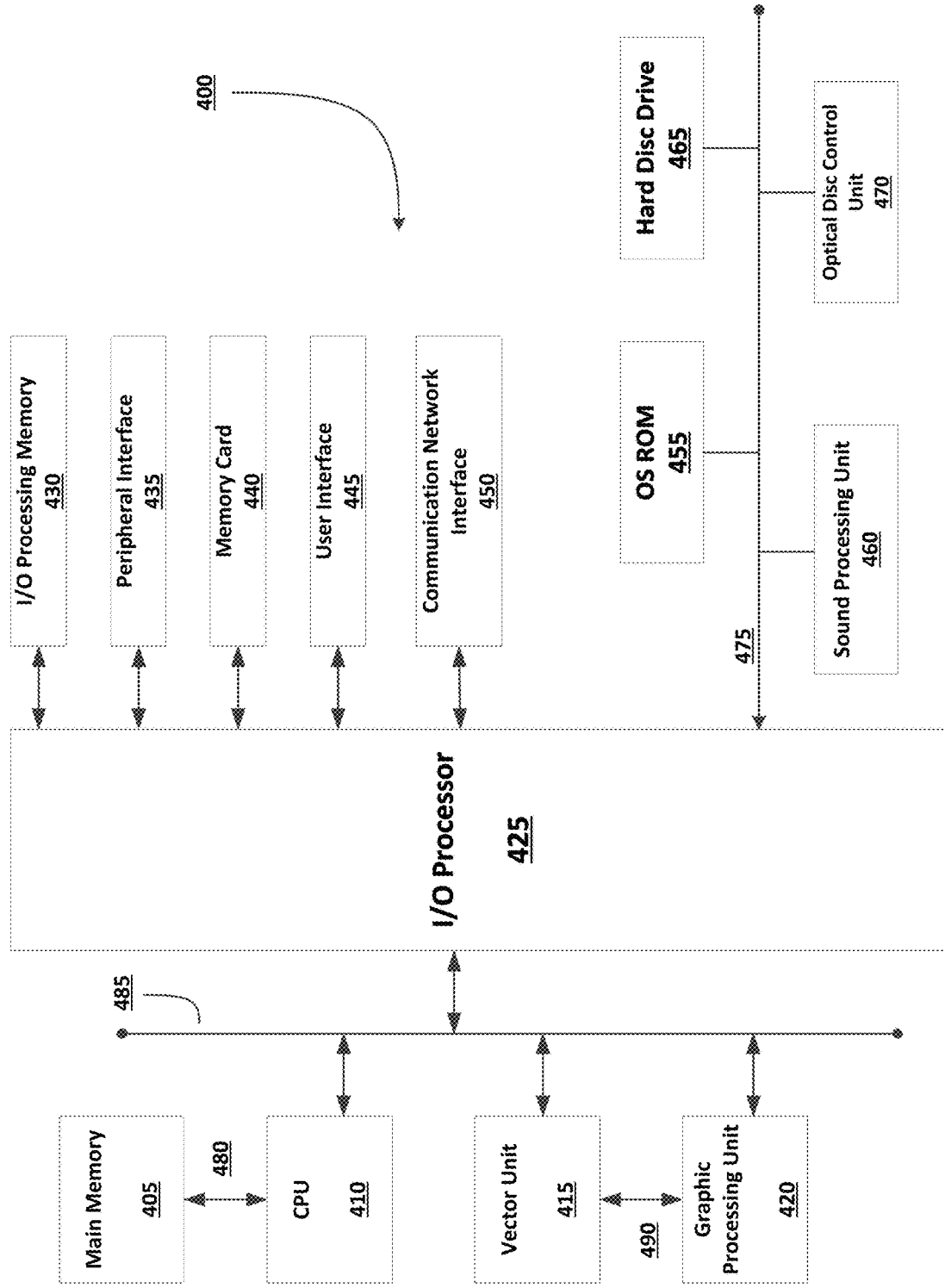
FIG. 4 is an exemplary electronic entertainment system that may be used in providing media-activity binding and content blocking.

FIG. 4 is an exemplary user electronic entertainment system that may be used in media-activity binding and content blocking. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing a content block, the method comprising:
   storing one or more activity data sets associated with a media content title, wherein the one or more activity data sets include data about an activity displayed during at least a portion of the media content title;
   receiving a user request from a user device of a user associated with a user profile specifying a list of user activities that include completed activities in which the user has engaged;
   identifying a trigger indicating that an upcoming activity yet to be displayed is not on the list of user activities, wherein the trigger is identified when an activity identifier for the upcoming activity does not match any activity identifier associated with the user activities in the list; and advancing display of the media content title to a next activity identified as being on the list of user activities.

2. The method of claim 1, wherein the media content title is a help video relevant to a user interaction with the media content title, and wherein the help video is suggested to the user based on a current activity engaged in by the user.

3. The method of claim 2, wherein the help video is generated by a peer.

4. The method of claim 2, wherein the help video is generated by a publisher of the media content title.

5. The method of claim 1, wherein the media content title is user-generated content suggested to the user based on the list of user activities.

6. The method of claim 1, wherein each activity data sets includes a direct link to the associated activity.

7. The method of claim 6, further comprising:
receiving a selection by the user of the activity shown in the media content title, and
directly launching the associated activity within the associated media content title based on the direct link.

8. The method of claim 1, wherein each of the completed activities and the in progress activities is associated with a corresponding activity identifier.

9. The method of claim 8, wherein identifying the trigger further comprises:
retrieving an associated activity identifier from the one or more activity data sets associated with the activity prior to display of the activity; and
comparing the retrieved activity identifier to each activity identifier associated with the list of user activities.

10. The method of claim 1, wherein each activity data set of the media content is associated with a corresponding activity identifier.

11. A system for providing a content block, the system comprising:
memory that store a media content title associated with one or more activity data sets, wherein the one or more activity data sets includes data about an activity displayed during at least a portion of the media content title; and
a processor that executes instructions stored in memory, wherein execution of the instructions by the processor:
receives a user request from a user device of a user associated with a user profile specifying a list of user activities that include completed activities in which a user has engaged;
identifies a trigger indicating that an upcoming activity yet to be displayed is not on the list of user activities, wherein the trigger is identified when an activity identifier for the upcoming activity does not match any activity identifier associated with the user activities in the list; and
advances display of the media content title to a next activity identified as being on the list of user activities.

12. The system of claim 11, wherein the media content title is a help video relevant to a user interaction with the media content title, and wherein the help video is suggested to the user based on a current activity engaged in by the user.

13. The system of claim 12, wherein the help video is generated by a peer.

14. The system of claim 12, wherein the help video is generated by a publisher of the media content title.

15. The system of claim 11, wherein the media content title is user-generated content suggested to the user based on the list of user activities.

16. The system of claim 11, wherein each activity data set includes a direct link to the associated activity.

17. The system of claim 16, further comprising:
receiving a selection by the user of the activity shown in the media content title, and
directly launching the associated activity within the associated media content title based on the direct link.

18. The system of claim 11, wherein each of the completed activities and is associated with a corresponding activity identifier.

19. The system of claim 18, wherein identifying the trigger comprises:
retrieving an associated activity identifier from the one or more activity data sets associated with the activity prior to display of the activity; and
comparing the retrieved activity identifier to each activity identifier associated with the list of user activities.

20. The system of claim 11, wherein each activity data set of the media content title is associated with a corresponding activity identifier.

21. A non-transitory computer-readable medium having embodied thereon a program executable by one or more processors to perform a method for providing a content block, the method comprising:
storing a media content title associated with one or more activity data sets, wherein the one or more activity data sets includes data about an activity displayed during at least a portion of the media content title;
receiving a user request from a user device of a user associated with a user profile specifying a list of user activities that include completed activities in which the user has engaged;
identifying a trigger indicating that an upcoming activity yet to be displayed is not on the list of user activities, wherein the trigger is identified when an activity identifier for the upcoming activity that is retrieved does not match any activity identifier associated with the user activities on the list of user activities; and
advancing display of the media content title to a next activity identified as being on the list of user activities.

22. The method of claim 1, wherein the list of user activities include in-progress activities in which the user has engaged.

23. The system of claim 11, wherein the list of user activities include in-progress activities in which the user has engaged.

24. The non-transitory computer-readable medium of claim 21, wherein the list of user activities include in-progress activities in which the user has engaged.

* * * * *